United States Patent [19]

Bailey

[11] Patent Number: 4,508,971
[45] Date of Patent: Apr. 2, 1985

[54] TWO RESERVOIR SOLAR AIR-WEIGHT IMPELLING HYDRO POWER SYSTEM

[76] Inventor: Wayne E. Bailey, R.D. #2, Schaghticoke, N.Y. 12154

[21] Appl. No.: 406,264

[22] Filed: Aug. 9, 1982

[51] Int. Cl.³ .......................... F03G 7/02; F03G 7/04; F04F 1/18
[52] U.S. Cl. ................ 290/1 R; 60/641.12; 417/108; 290/54
[58] Field of Search .................. 290/1 R, 1 A, 54, 43; 417/108; 60/641.12

[56] References Cited

U.S. PATENT DOCUMENTS 1,005,911  10/1911  Wilbur .
4,041,710  8/1977  Kraus et al. ............................ 60/689
4,110,980  9/1978  Foulke ................................ 417/108
4,342,920  8/1982  Bucknam ............................ 290/1 R
4,392,062  7/1983  Bervig ................................ 417/108

Primary Examiner—J. V. Truhe
Assistant Examiner—Shelley Wade

[57] ABSTRACT

Using a two Reservoir System, a portion of the water moves from Reservoir to Reservoir. In its path, it collects air, which is expanded by Solar Energy, which helps to move weights, by an expanding and contracting float method to create substantial Hydro Power, after which it returns back to the path of which it started, without causing any pollution and without using any outside fuel whatsoever.

2 Claims, 4 Drawing Figures

TWO RESERVOIR SOLAR AIR-WEIGHT IMPELLING HYDRO POWER SYSTEM

Presently there are basically two ways of creating energy (electricity) for public consumption. However both ways Carbon Fuel and Atomic Plants, require a fuel source and there is a physical problem of transporting coal, oil and uranium in order to fire these power plants so to speak, (uranium is a re-action). Waste of course is yet another problem.

The other source of Electric Power, Natural Hydro, is only located in certain rivers and streams in various geographic locations throughout the world. And even though natural hydro has no pollutants, the other two sources of created electricity have been known to come under public scrutiny for their various forms of tainting the earth.

A continuous natural way of creating electricity has been a long sought after goal of many inventors.

My invention about to be described herein, accomplishes that long sought after goal of creating electrical power without the use of any fuel to pollute the atmosphere.

In the present energy starved world, this and other fueless continuous inventions will fulfill a need of great (monumental) proportions, thus saving many of our natural resources. (Oil can be used for plastics etc., coal for industrial diamonds, and oil and gas.)

In this application,

Figure 1:
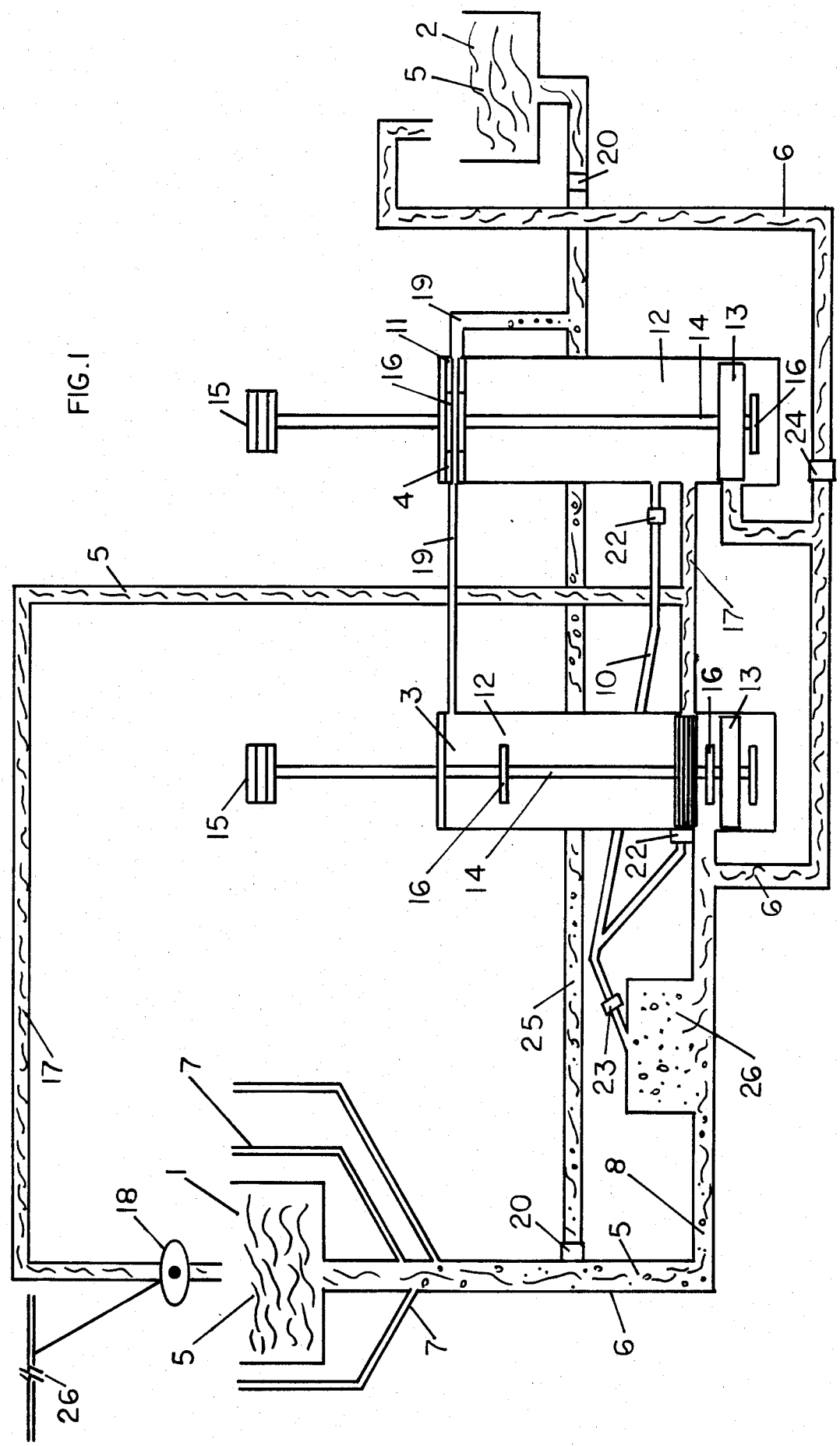
FIG. 1 shows the overall system in operation.

In describing the various parts of FIG. 1, the operation of the Weight Movement Pump utilizing the Cylinder Shut Off Valve device for incoming water, we will start with the two Reservoirs and then go on to number various other components, that make up the system.

Numeral 1, is Reservoir 1, 2, is Reservoir 2, Numeral 3, is Weight Movement Pump 1. Numeral 4, is Weight Movement Pump 2. Numeral 5, is the Water throughout the system, 6 is the Flow Conduit, 7 is the Inclined Orifices, 8 is the Air Pressure Feed Tunnel, 9 is the Air Pressure Chamber, 10 is the Air Feed Lines, 11, is the Bladder Floats, 12, is the Pump Chamber. Numeral 13, is the Cylinder Shut Off Valve, 14 is the Pump Connecting Rod, 15, is the Pump Weights, 16, are the Movement Collars, 17, is the Water Outlet Conduit, 18, are the Water Turbines connected to Generators for the Production of Consumer Power. Number 19, is the Air Outflow Pipe, 20 is the Air Feed Check Valves, 21, is the Solar Panels, 22, is the Solar Heaters, operated by the Panels, 23 is the Air Chamber Pressure Release Valve, 24, the Manually Operated Flow Valve 25, the water outflow pipe and 26 the (Electric) Power Lines.

In describing the operation of the system, contained in FIG. 1, Water in Reservoir 1, numeral 1, falls through Flow Conduit 6, as it moves it draws air through the inclined Orifices and carries it to the Air Pressure Feed Tunnel 8, and Air Pressure Chamber 9.

The air trapped with the Chamber is cool and dry because the cold water flowing through the Initial Flow Conduit absorbs the heat that's usually generated by the compression of air. It comes out drier, because the atmospheric moisture held in the air bubbles in the flow through the system condenses, so to speak on the bubbles walls, since those walls are colder than the air they're surrounding. Once trapped, the air pressurizes inside the chamber. As the flow of the water continues, more and more air is pressurized, a pressure gage and release valve are used in the release of the entrapped air through the Air Feed Lines 10, however they are not shown in FIG. 1.

The air is heated by Solar Heaters 22, as it passes through the Feed Lines and before entering the Bladder Floats 11. A Heat Exchanger vaporizes a working fluid with Solar heated water provided by Solar Panels 21. The Vapor drives a compressor shaft by passing through an expander section of Heat Pump. Exiting vapor joins vapor from a compressor outlet and the hot vapor condenses thereby heating the air flowing in the Bladder Floats 11. This Solar Heating System does require a pumping arrangement for conversion, however a separate system not shown in FIG. 1, connected to it, can operate with solar cells or photovotaic electricity to power the pump. The Hot Air makes the Bladder Floats 11, lighter, and easier to lift. The water 5, rushes under the Bladder Float, disconnecting it from the Air Feed Lines 10, and lifts it through the Pump Chamber 12, to Movement Collar 16. Collar 16, is fastened tightly to the Pump Connecting Rod. This Rod also has Weights 15, connected to it, which operates the Pump. The Head Force of the water plus the lightness of the Bladder Float lifts the Weights 15 high into the air above the Water Source, and thereby locks the Bladder Float into the Air Outflow Pipe 19, at the top of the Pump Chamber as it lifts the Weights into place. A Spring Operated Locking Device not shown in FIG. 1, holds the Weights in the air (atmosphere) while the Head Pressure of the water collapses the float in the chamber against the Movement Collar. The outgoing air feeds in the Air Outflow Pipe 19. After the Bladder Float collapses and remains flat, the force of the water pressure lifts the Pump Connecting Rod out of the Spring Operated Locking Device, and pulls the Cylinder Shut Off Valve into place, closing off the incoming water. This action thereby traps a given amount of water inside the Pump Chamber, the trapped water weighs considerably less than the weights connected to the Pump Connecting Rod, since that weight was floated into position by air which has been exhausted. Also, since the water trapped in the chamber, was being fed by a Head Pressure, that no longer exists, since it has been shut off by the Cylinder Shut Off Valve, it is lighter than the weights. Therefore, the Weights in a return motion along with the movement collar pushes the trapped water downward and out the Water Outlet Conduit which is of a smaller diameter than the Pump Chamber. This outlet is also connected to all the Pump Chambers, and is the one line rising above the initial Reservoir 1, which allows water to flow back into it, through Turbines connected to Generators 18, thus creating power or electricity for consumption by the public. After this work has been done the deflated Bladder Float meets the connecting valve for the Air Feed Line. Once this happens warm air again will feed into the Bladder Float causing expansion. This expansion will cause the Bladder Float to come into contact with another Movement Collar connected to the Pump Connecting Rod just above the Cylinder Shut Off Valve 13. When all three come into contact, the force of the expanding float will move the Cylinder Shut Off Valve down to the bottom of the chamber and allow incoming water to again refill, and once again start to raise the Bladder Float in an upward motion.

During the time of which the Cylinder Shut Off Valve closes off the flow of incoming water into the Pump Chamber, the water moves on to another Pump or series of pumps that are working at different stages of the float cycle.

As shown in FIG. 1, numeral 3, Pump 1, is at a Bladder Float air expanding or filler stage while Numeral 4, Pump 2, is shown as the Bladder Float is emptied of air in the Air Outflow Pipe 19. A series of these pumps at different stages can keep the water flowing for the induction of air into the system.

Numeral 2, Reservoir 2, is located in height, just below Reservoir 1. This is so oncoming water pushing through the Flow Conduit 6, can just about reach its own height, since water is known to meet its own level even though an intricate system exists. The water stored in Reservoir 2, was allowed to flow here at the beginning of the cycle in order to build up a substantial needed air pressure in the Air Pressure Chamber 9. A Manually Operated Flow Valve 24, will then close off the flow once the air pressure in the Air Pressure Chamber has built up substantially enough to fill the Bladder Floats in the system. Then the Manually Operated Valve will be left partially open or closed off completely due to the amount of water taken out by the Weight Movement Pumps.

The Warm Air Leaving the collapsing Bladder Floats in the upward Movement Stroke of the Weight Movement Pumps (In other words, the Air that's forced out into the Air Outflow Pipe 19) will force water out of Reservoir 2 back into the initial flow through Pipe 25 and through the operation of Air Feed Check Valve 20. Now Air that was once used to float Weight up into the atmosphere is now used as pressure to push water along a flow pipe back across the system and into the initial downward flow once again to be used over in the system.

It is also within the scope of this inventive process to use the Bladder Float 11, not only as a float, but also as a Weight. After compressed air has been released from the float on the upward stroke into the Air Outflow Pipe 19, the deflated float could be reconnected by valving (not shown in FIG. 1) with Water Outflow Pipe 25. Here, Bladder Float 11, would refill with a water and Air Mixture to become a Weight, in reverse to its former role. Thus the new Weight added to those above it, could have an outlet at the base of the Pump when it reaches that level (also refilling with air from Feed Line 10, for its upward lifting work. The water expelled from the Float could be dropped into the Initial Flow Pipe 6, or pushed with the trapped Chamber water through the Water Outlet Conduit 17, above its initial source.

Also, the Solar Heaters 22, could be moved near the ground level of Reservoir 1, in order to obtain water to produce steam. Then, both Steam and Compressed Air from Air Feed Lines 10, could be fed directly into the Pump Chamber 12, or the Steam could be fed into the Bladder Float 11, while Air is fed seperately into Chamber 12. Three phases of energy would then be utilized in bringing the liquid or water, above its initial source in order to produce power for the public.

Methods could be utilized to combine the exhausted air and steam or they could be recycled seperately to perform other tasks within the system.

While the prior art has known most of the steps in various ways in this system, the advantages are unexpected and substantial.

Those versed in the Energy Field now contend, that many different sources must be used to obtain Energy Independence. The sources described in this system are combined therefore, in a unique way to gain that end result.

Two sources of energy contained in this system are used twice. The water to carry air and lift weights or changed to steam to carry itself, and the air to lift weights and force water back to its initial source to create energy. Nothing is lost or used up in the system, even though some inefficency is apparent due to friction. By making effective use of the Water, Air and Weights, the substantial electrical output of the system will tend to completely overcome these frictional obstacles, and there also remains the possibility of returning a portion of the electricity created back to the system for use if that need should arise.

Figure 2:
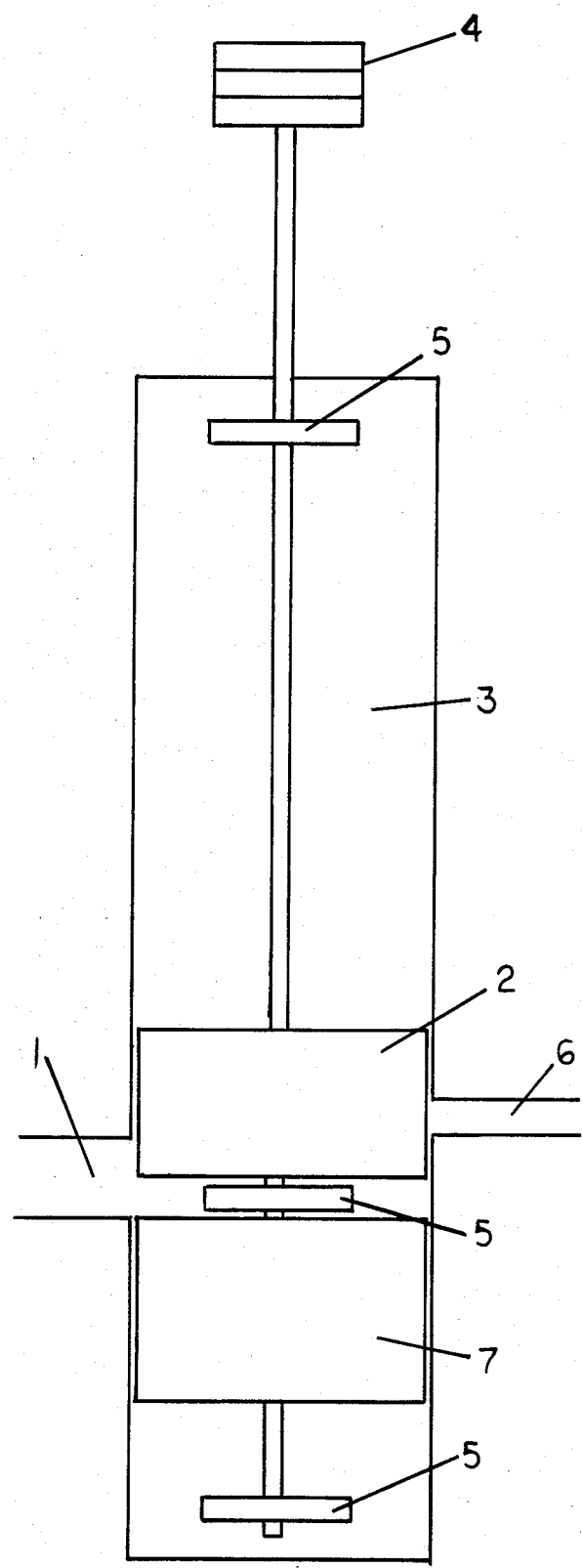
FIG. 2 shows in detail the Weight Movement Pump used in FIG. 1, in the overall system, with the Cylinder Shut Off Valve Device for incoming water.
Figure 3:
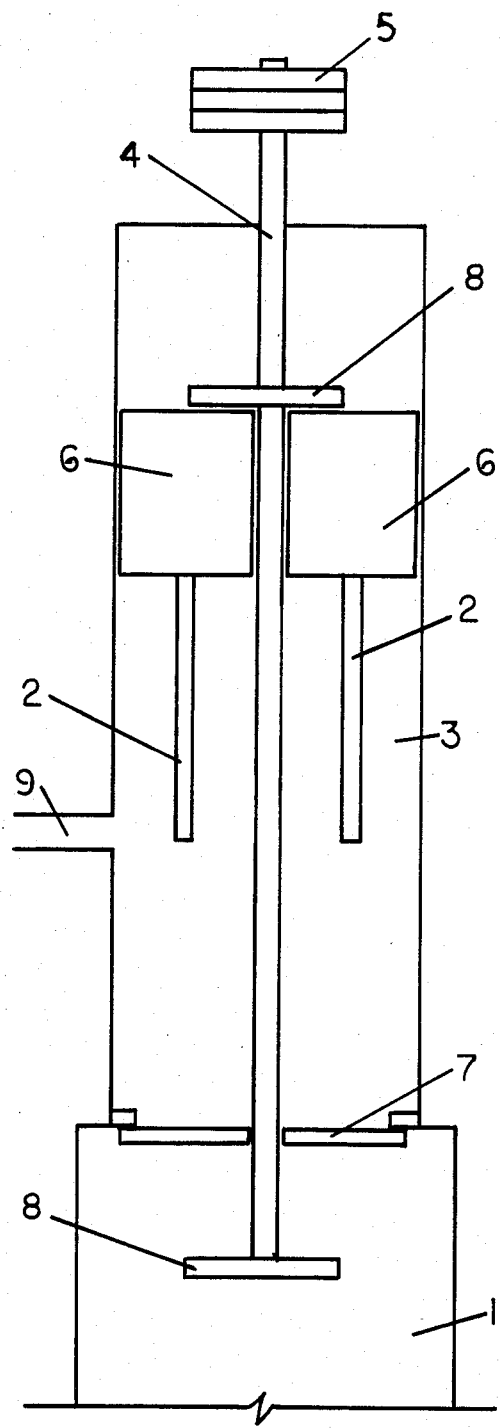
FIG. 3 shows the Weight Movement Pump with a Sliding disc-Flap Closer Shut Off Valve at various stages of operation.
Figure 4:
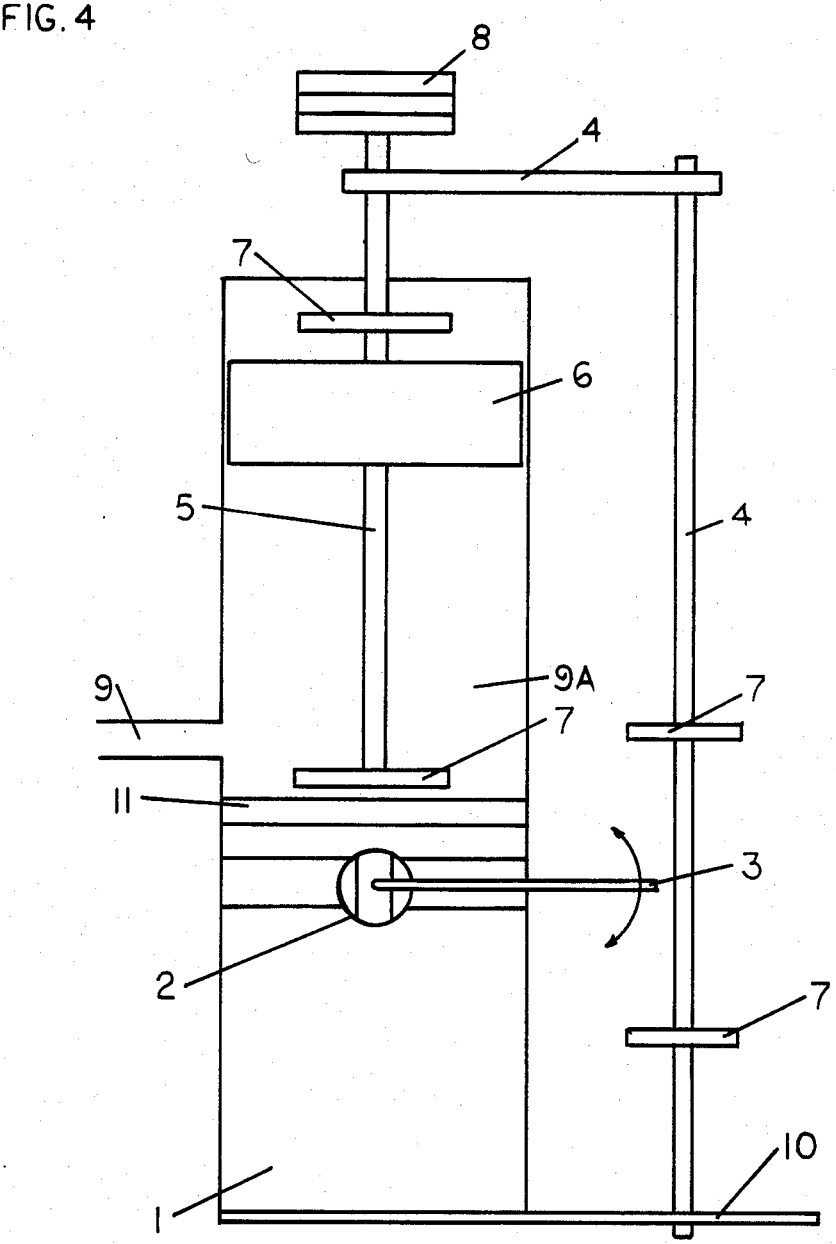
FIG. 4 shows a Weight Movement Pump with a Ball Type Shut Off Valve in use with an Outside Chamber Connecting Rod.

In this application, FIGS. 2-4 indicate in detail some variations of the Weight Movement Pump, in reference to the Water Input Conduit Valving. Other variations may exist, however as part of this invention any pump containing floats of various kinds moving Weights into the Atmosphere by the downward pressure of falling water are hereby considered part of this inventive process.

Describing the parts in FIG. 2, we see, Numeral 1, is the In-flow Conduit, 2 is the Float, that can be made up of a solid substance or the Bladder Type as described in FIG. 1. Numeral 3, is the Pump Chamber, 4, are the Weights, 5, the Movement Collars, 6, the Weight Connecting Rod, 7, the water Outlet Conduit and 8, the Cylinder Shut Off Valve.

In operation, water incoming through the In-Flow Conduit raises Float 2, up to Movement Collar 5, (these collars within the Pump are all connected to Weight Connecting Rod 6). The water lifts the Weights into position above the Pump and in the same motion raise the Cylinder Shut Off Valve from the bottom chamber part of the Pump with the use of a Movement Collar connected to the bottom of the Weight Connecting Rod. This closes off the incoming water flow from the In-Flow Conduit. The Weights then being heavier than the trapped water within the Pump Chamber 3, then push the float downward and the water out the outflow pipe before coming into contact with another movement collar which in turn comes into contact with the Cylinder Shut Off Valve, because of the downward pressure. This action pushes the Cylinder Valve open again to repeat the cycle.

In FIG. 3, this Weight Movement Pump uses a Sliding Disc Flap Closer Shut Off Valve.

Numeral 1, is the In-Flow Conduit, coming in from the bottom of the pump. Number 2, is the Float, 3 is the Pump Chamber, 4 is the Weight Connecting Rod, 5 is the Weights, 6 are the Float Protruding Legs. Number 7 is the Sliding Disc or Flaps, that either move freely upon the Weight Connecting Rod or are connected to the chamber (Disc moves freely, flaps are connected, and when flaps are used instead of collar at the end of the Rod, a Disc is substituted) Number 8 are the Movement Collars and 9, is the Water Outlet Conduit.

In explaining the operation of this Weight Movement Pump, water entering the In-Flow Conduit 1, raises the Float in Pump Chamber 3. The Float 2, slides up the Weight Connecting Rod 4, until it comes into contact with the Upper Movement Collar 8, which is connected to the Rod. When Upper Collar 8, touches the top of the Chamber of the Pump, the Bottom Collar 8, at the opposite end of the same Rod will have closed off the inward water flow, thus causing the weights to reverse themselves and push the trapped chamber water out Water Outlet Conduit 9. When the Float Protruding Legs, being pushed by the Weights in a downward movement reach the level of the Outlet Conduit, they will begin to touch the Flaps 7, pushing them open allowing water back into the Pump Chamber to start the cycle over again. The Flaps are always pulled closed when the Rod again moves its entire length because the Collar at the end of the Rod, snaps them closed.

In FIG. 4, we show a Ball Valve Operated Weight Movement Pump.

Numeral 1, is the In-Flow Conduit, coming in from the bottom of the Pump. Number 2 is a Ball Valve operation, 3, is the Ball Connecting Arm, 4, is the Outside Chamber Connecting Rod, 5, is the Float Connecting Rod, 6, is the Float, 7, are the Movement Collars attached to both Rods of this Pump, 8 is the Movement Weights, 9, the Water Outlet Conduit, 9A, the Pump Chamber, 10, the Rod Guide, and 11, the Rod Guide Grating.

As the water flows into the open Ball Valve Operated Weight Movement Pump it pushes the Float up along the Float Connecting Rod 5, until it comes into contact with the Movement Collar connected to it, whereupon it starts to move the weights in an upward motion. This moves the Outside Chamber Connecting Rod 4 up, which also pulls the Ball Connecting Arm in an upward motion with it, closing off the flow, once the weights have lifted to their maximum height. Two Movement Collars attached to the Outside Chamber Connecting Rod above and below the Ball Connecting Arm force movement of the arm and the Valve itself. Once, the water has stopped coming into the Pump Chamber 9A, the Movement Weights will begin their downward descend pushing against the inside Chamber Collar and Float and also moving the Outside Chamber Connecting Rod in a downward motion forcing the upper Collar on that rod against the Ball Connecting Arm. As the Arm starts its downward descend outside the Pump Chamber, the inside water is being forced out the Water Outlet Conduit 9. Once the float has moved completely down into the chamber in an almost even position with the Outlet Conduit, the Ball Connecting Arm will have moved all the way down admitting a full water force which will start the Pump cycle all over again. The Rod Guide on the Outside Chamber Connecting Rod, assures a steady vertical movement, while Numeral 11, the Rod Guide Grating which is an open mesh or screening to allow water flow with no restriction, provides a stand for a movement collar and the Float Connecting Rod. A Rod Guide might also be within the chamber without affecting the Weight Movement Pump's function, however one is not shown in FIG. 4.

A Weight Movement Pump may also be operated with a Float-Spring Actuated Type Valve within the Pump Chamber, however this combination was not used in FIGS. 1 through 4.

All the Pumps in FIGS. 2 through 4 are automatically primed since incoming water will reach its own level in the Conduit or Chamber Outflow Pipes. In FIG. 2, the Outflow Pipe is Numeral 1. In FIG. 3, its numeral 9 and in FIG. 4, the Outflow Pipe is also Numeral 9.

All Drawings in this application are diagrammatic.

I claim:

1. A method of using heat to produce work, comprising the steps of:
    (a) entraining gas into a flow of liquid from an upper reservoir;
    (b) releasing continuous quantities of said entrained gas into a chamber until it is compressed;
    (c) exposing said compressed gas to a heat source and releasing it into a vertically movable container;
    (d) allowing said container to rise due to increased buoyancy from said heated compressed gas; and
    (e) releasing said compressed gas from said container at a point in its vertical path of travel and allowing said container to fall.

2. The method of claim 1, further comprising the step of using part of the work obtained to return said liquid to said upper reservoir.

* * * * *